United States Patent
Kammerzell

(10) Patent No.: US 8,376,036 B2
(45) Date of Patent: Feb. 19, 2013

(54) AIR TO AIR HEAT EXCHANGER

(75) Inventor: Larry L. Kammerzell, Phoenix, AZ (US)

(73) Assignee: AZ EVAP, LLC, Phoenix, AZ (US)

( * ) Notice: Subject to any disclaimer, the term of this patent is extended or adjusted under 35 U.S.C. 154(b) by 1093 days.

(21) Appl. No.: 12/263,409

(22) Filed: Oct. 31, 2008

(65) Prior Publication Data
US 2009/0114369 A1    May 7, 2009

Related U.S. Application Data

(60) Provisional application No. 60/985,165, filed on Nov. 2, 2007.

(51) Int. Cl.
F28F 3/00      (2006.01)
F28F 9/00      (2006.01)

(52) U.S. Cl. ........................ 165/166; 165/167

(58) Field of Classification Search .......... 165/59, 165/67, 165, 166, 167, 170, 109.1
See application file for complete search history.

(56) References Cited

U.S. PATENT DOCUMENTS

| | | | |
|---|---|---|---|
| 1,750,047 A | | 3/1930 | Metzger |
| RE17,973 E | * | 2/1931 | Mosher .................. 165/76 |
| 2,321,110 A | * | 6/1943 | Shipman .................. 165/160 |
| 2,497,947 A | | 2/1950 | Lewis |
| 3,262,682 A | | 7/1966 | Bredberg |
| 3,353,802 A | | 11/1967 | Greer |
| 3,590,917 A | * | 7/1971 | Huber et al. .................. 165/166 |
| 3,788,542 A | | 1/1974 | Mee |
| 3,893,509 A | * | 7/1975 | Satchwell et al. ............ 165/166 |
| 3,929,537 A | | 12/1975 | Erwin |
| 3,958,959 A | | 5/1976 | Cohen et al. |
| 3,987,845 A | | 10/1976 | Potthoff et al. |
| 3,994,999 A | | 11/1976 | Phelps |
| 4,023,949 A | | 5/1977 | Schlom |
| 4,031,180 A | | 6/1977 | Bohanon |
| 4,125,153 A | | 11/1978 | Stoneberg |
| 4,137,058 A | | 1/1979 | Schlom |
| 4,156,351 A | | 5/1979 | Schlom et al. |
| 4,215,079 A | | 7/1980 | Christophersen et al. |
| 4,227,572 A | | 10/1980 | Harlan |
| 4,269,796 A | | 5/1981 | Glicksman et al. |
| 4,300,629 A | | 11/1981 | Hatada |
| 4,310,476 A | | 1/1982 | Nahra et al. |
| 4,315,873 A | | 2/1982 | Smith et al. |

(Continued)

OTHER PUBLICATIONS

2000 ASHRAE Systems and Equipment Handbook—Chapter 43 Heat Exchanger.

(Continued)

Primary Examiner — Tho V Duong
(74) Attorney, Agent, or Firm — The von Hellens Law Firm, Ltd.

(57) ABSTRACT

A compact heat exchanger efficiently and cost-effectively exchanges heat from one gas stream to another through counter flow channels between parallel plates. Foam strips are incorporated to form the sides of the flow channels that allow channeling and directing the flow of air on each side of a plate heat transfer surface in patterns to maximize the heat exchanger's effectiveness and maintain the gap between heat transfer plates and form the pressure boundary at the edge of the heat exchanger. Clips are incorporated in strategic locations of each plate to locate and mechanically connect the plates to one another and to maintain the location of the foam strips. The heat transfer of the heat exchange surfaces are enhanced using rounded dimples and protrusions arranged such that these occur on the top and bottom of the flow channels.

19 Claims, 6 Drawing Sheets

ASSEMBLED HEAT EXCHANGER

SINGLE HEAT EXCHANGER PLATE

U.S. PATENT DOCUMENTS

| | | | |
|---|---|---|---|
| 4,350,201 A | 9/1982 | Steineman | |
| 4,361,184 A | 11/1982 | Bengtsson | |
| 4,380,910 A | 4/1983 | Hood | |
| 4,441,557 A | 4/1984 | Zublin | |
| 4,554,719 A | 11/1985 | Lewis | |
| 4,665,975 A * | 5/1987 | Johnston | 165/167 |
| 4,681,155 A | 7/1987 | Kredo | |
| 4,752,419 A | 6/1988 | Sperr, Jr. et al. | |
| 4,848,450 A | 7/1989 | Lapkowsky | |
| 4,933,117 A | 6/1990 | Wilson | |
| 4,953,831 A | 9/1990 | Albrecht | |
| 4,968,457 A | 11/1990 | Welch | |
| 5,072,790 A | 12/1991 | Lapowsky | |
| 5,130,063 A | 7/1992 | Collins et al. | |
| 5,301,518 A | 4/1994 | Morozov et al. | |
| 5,469,914 A * | 11/1995 | Davison et al. | 165/166 |
| 5,600,960 A | 2/1997 | Schwedler et al. | |
| 5,606,868 A | 3/1997 | Calvert | |
| 5,664,433 A | 9/1997 | Bourne | |
| 5,709,264 A | 1/1998 | Sweeney | |
| 5,775,580 A | 7/1998 | Sizemore et al. | |
| 5,785,117 A | 7/1998 | Grinbergs | |
| 5,832,992 A | 11/1998 | Van Andel | |
| 5,944,094 A | 8/1999 | Kinney, Jr. et al. | |
| 5,966,953 A | 10/1999 | Murr et al. | |
| 5,971,370 A | 10/1999 | Galabinski | |
| 6,076,598 A | 6/2000 | Doi et al. | |
| 6,206,348 B1 | 3/2001 | Imsdahl et al. | |
| 6,311,712 B1 | 11/2001 | Meyer | |
| 6,338,258 B1 | 1/2002 | Lee et al. | |
| 6,364,007 B1 * | 4/2002 | Fischer | 165/166 |
| 6,367,277 B1 | 4/2002 | Kinkel | |
| 6,378,322 B1 | 4/2002 | Calvert | |
| 6,390,122 B1 | 5/2002 | Zhang et al. | |
| 6,516,874 B2 * | 2/2003 | Mathur et al. | 165/166 |
| 6,591,620 B2 | 7/2003 | Kikuchi et al. | |
| 6,595,235 B1 | 7/2003 | Zhang | |
| 6,672,375 B1 | 1/2004 | Shippy | |
| 6,715,713 B2 * | 4/2004 | Marche | 244/57 |
| 6,845,629 B1 | 1/2005 | Bourne et al. | |
| 6,854,278 B2 | 2/2005 | Maisotsenko et al. | |
| 6,928,833 B2 | 8/2005 | Watanabe | |
| 6,942,024 B2 | 9/2005 | Nies | |
| 6,966,364 B1 | 11/2005 | Babikian et al. | |
| 2003/0001294 A1 | 1/2003 | Permenter | |
| 2004/0031599 A1 * | 2/2004 | Wilson | 165/166 |
| 2004/0226685 A1 * | 11/2004 | Gagnon et al. | 165/54 |
| 2008/0156469 A1 * | 7/2008 | Lee et al. | 165/166 |

OTHER PUBLICATIONS

2000 ASHRAE Handbook: HVAC Systems and Equipment—Chapter 44 Air to Air Energy Recovery.

2000 ASHRAE Handbook: HVAC Systems and Equipment—Chapter 19 Evaporative Air Cooling Equipment.

Hays Fluid Controls, MeasurFlo Automatic Balancing Valve, Flyer 10000452 Rev 03.

Premier Industries, Inc. at Houston, Texas: Industrial Evaporative Cooler, www.piec.com, May 12, 2006, pp. 1-4.

www.piec.com: Premier Industrial Evaporative Cooler, Oct. 10, 2006, pp. 1-3.

2003 ASHRAE Handbook: Applications—Chapter 51 Evaporative Cooling Applications.

\* cited by examiner

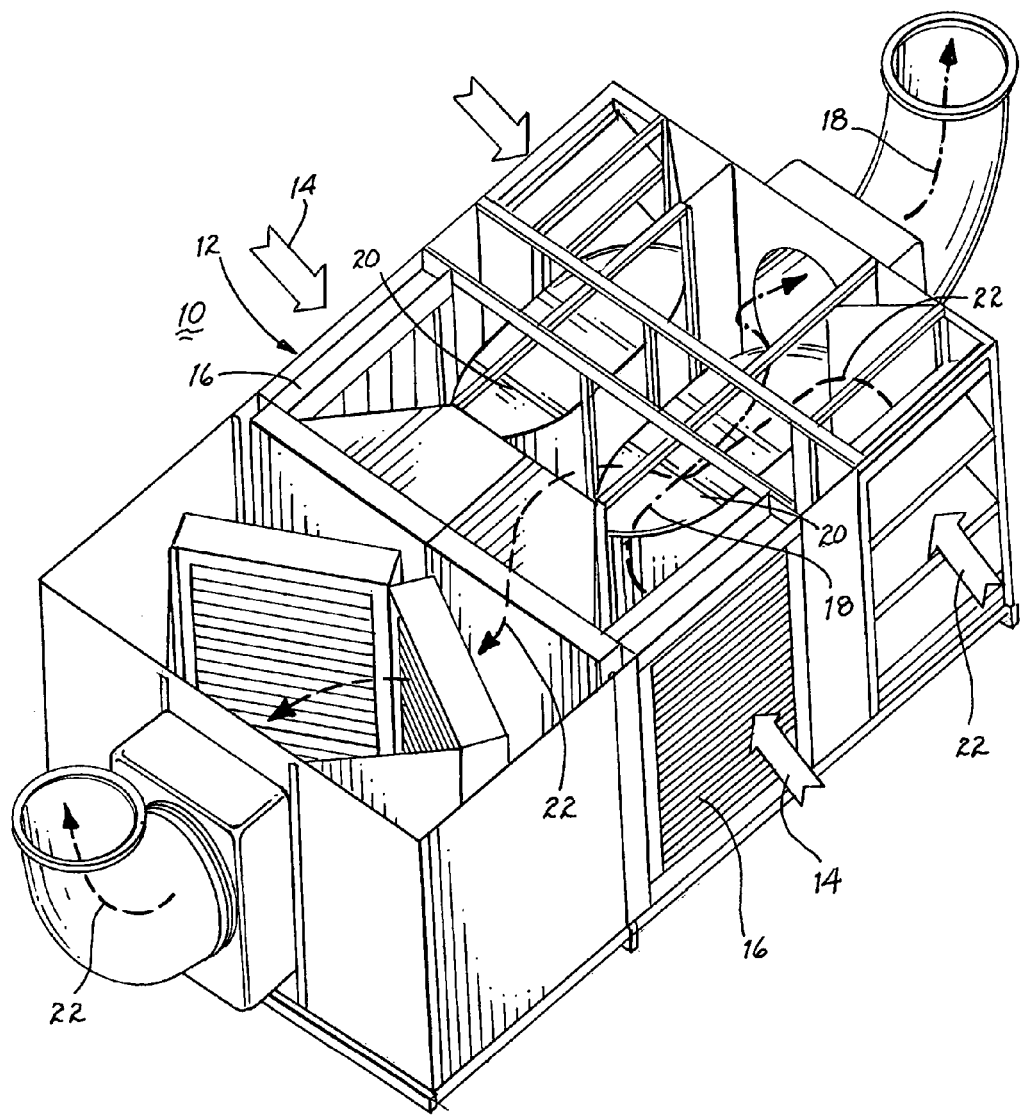
FIG. 2-
2 STAGE EVAPORATIVE COOLER

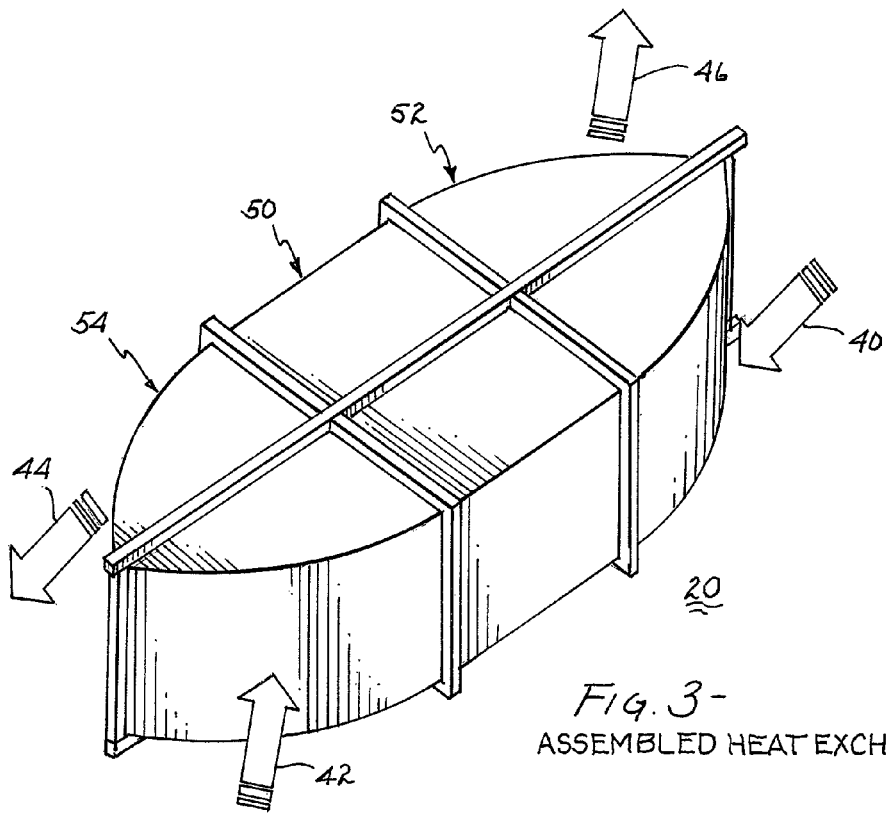
Fig. 3 -
ASSEMBLED HEAT EXCHANGER
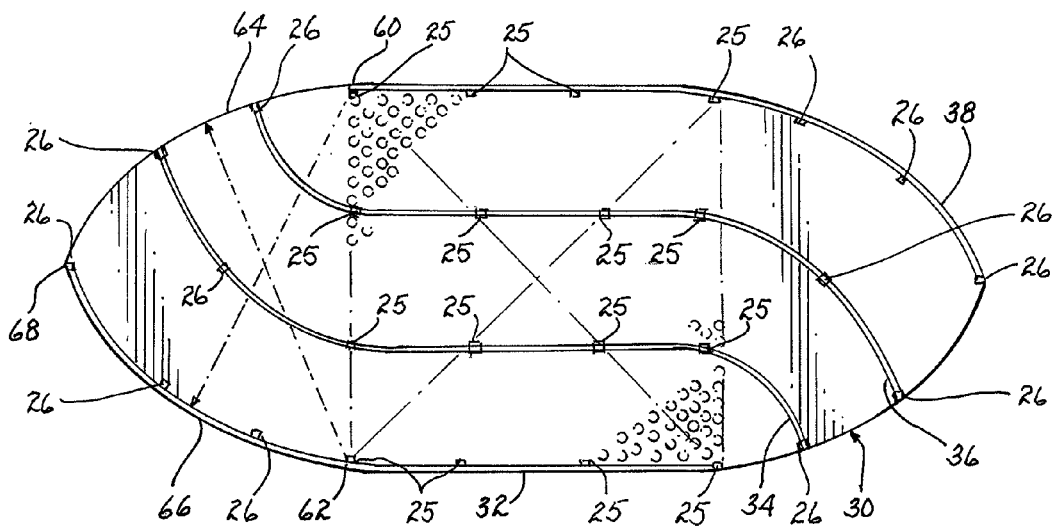
Fig. 4
SINGLE HEAT EXCHANGER PLATE

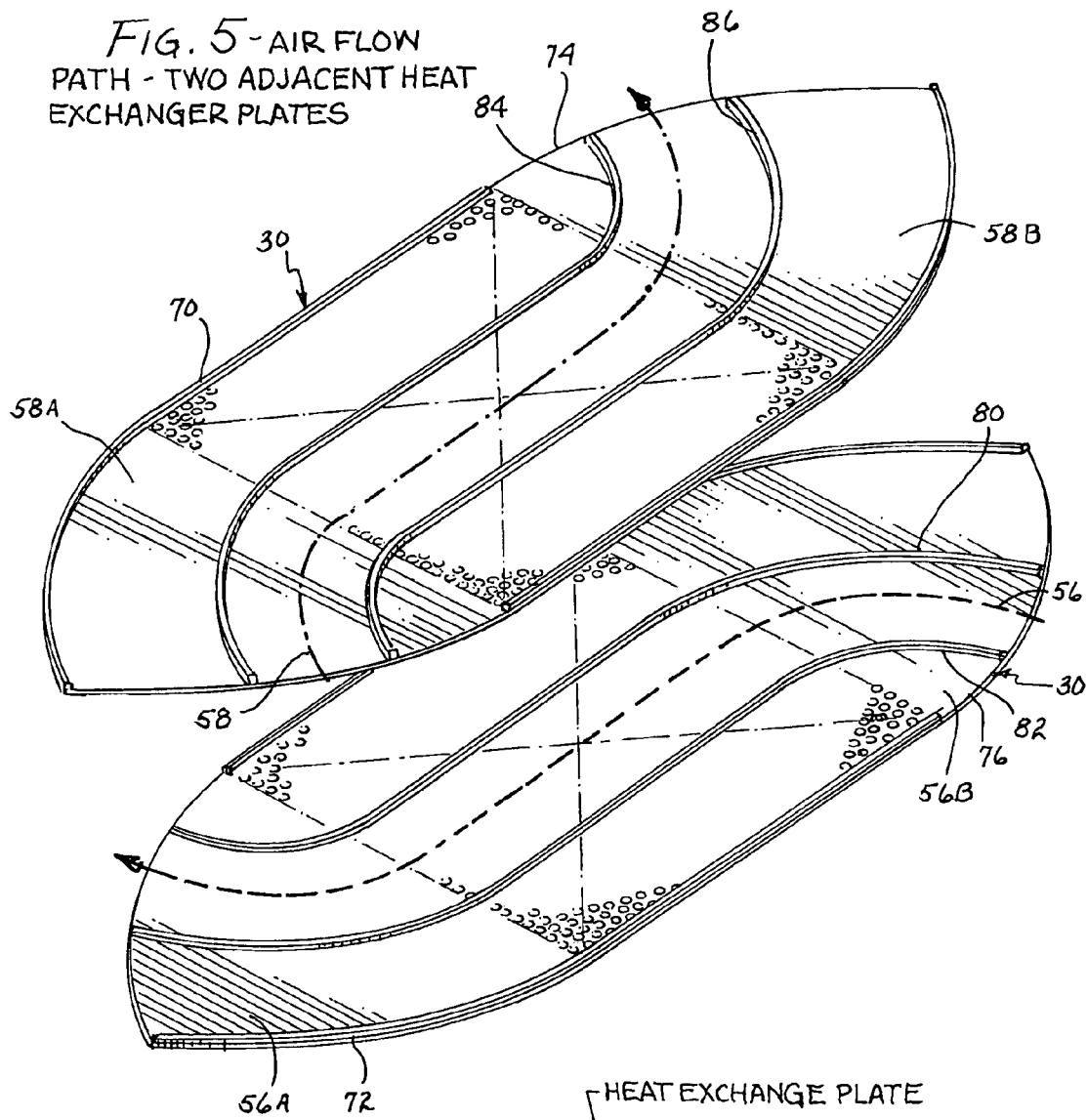
FIG. 5 - AIR FLOW PATH - TWO ADJACENT HEAT EXCHANGER PLATES
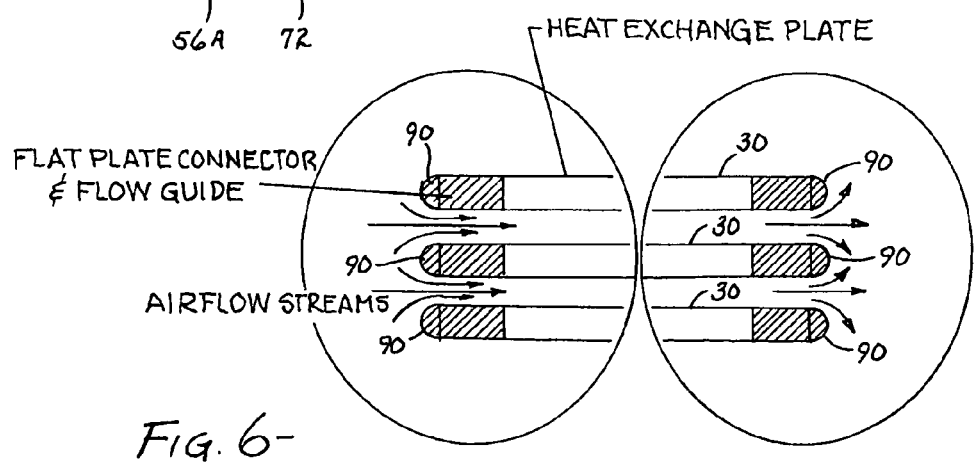
FIG. 6 - STREAMLINED ENTRANCE AND EXIT CHANNEL

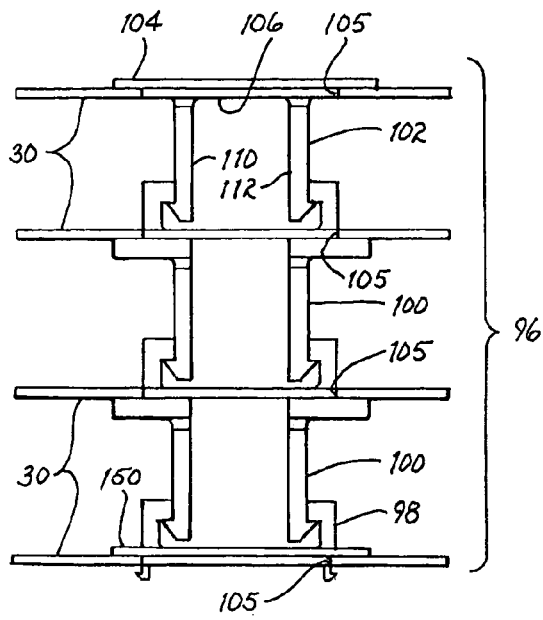
Fig. 7 ASSEMBLED CLIP STACK
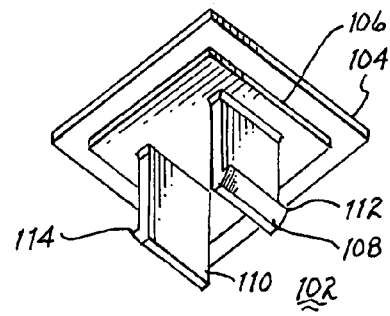
Fig. 7d - TOP CLIP
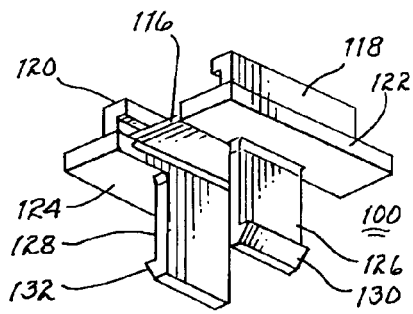
Fig. 7c - PARALLEL CLIP
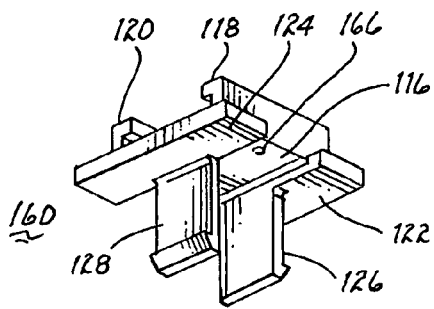
Fig. 7a - PERPENDICULAR CLIP
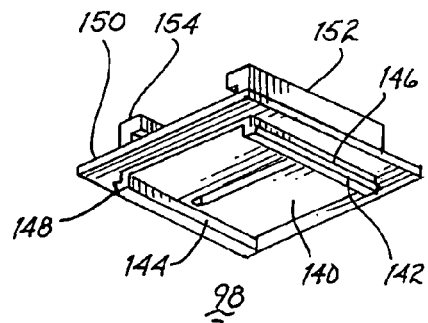
Fig. 7b - BOTTOM CLIP

AIR TO AIR HEAT EXCHANGER

CROSS-REFERENCE TO RELATED APPLICATION

The present application is related to and claims priority to a provisional application entitled "Air to Air Heat Exchanger" filed Nov. 2, 2007, assigned Ser. No. 60/985,165 and disclosing an invention by the present inventor.

BACKGROUND OF THE INVENTION

1. Field of the Invention

The invention is directed to a flat plate air-to-air heat exchanger having a heat exchanger core formed by using gasket strips and interlocking clips to structurally join enhanced heat transfer surfaces. Uniquely shaped thin flat plate metal sheets create flow channels and heat transfer surfaces necessary to promote a combination of cross-flow and counter-flow heat exchange between two air streams to yield both a thermally efficient and cost-effective heat exchange configuration.

2. Description of Related Art

Heat exchangers, of which air-to-air heat exchangers are a subset, have been widely used in industrial processes, energy systems, and air conditioning and refrigeration systems for many years where there is a need to transfer energy between two fluid streams to achieve the system or process objectives without having direct contact between these two fluid streams. Heat exchangers using metal cores are capable of operating at elevated temperatures and pressures. These heat exchangers also exhibit high efficiency heat transfer. Flow and pressure boundary joints of metal heat exchangers are typically welded or formed by bending the metal to form a mechanical joint that is allowed to leak or is sealed with joint compound. It is widely known that the counter-flow (fluids flow in opposite directions) heat exchanger configuration is more efficient (requires the least amount of surface area to transfer the heat load) than the cross-flow configuration (fluids flow perpendicular to each other). Since a square or rectangular plate has four (4) sides or two pair perpendicular to each other, it is straight forward to configure a crossflow heat exchanger and much more complex to configure a counter flow heat exchanger to convectively exchange heat between two air streams.

ASHRAE Handbook, Chapter 43 'HVA Systems and Equipment', provides a summary of the current art of heat exchanger design and fabrication. In particular, this reference points to shell and tube, double pipe, finned tube, spiral plate, plate and frame, and plastic heat exchangers as the current configurations of heat exchangers covered by the current art. ASHRAE Handbook, Chapter 4 'Air-to-Air Energy Recovery', provides a summary of the state of the art heat exchange devices deployed to recover energy from an airstream at a high temperature to an airstream at a lower temperature. Included in the discussion of these devices is the air-to-air fixed plate heat exchanger which is available in many configurations, materials, sizes, and flow patterns. The plates are formed with spacers or separators (e.g., ribs, dimples, ovals) constructed into the plates or with external separators (e.g., supports, braces, corrugations). Airstream separations are sealed by folding, multiple folding, gluing, cementing, welding, or any combination of these, depending on the application and manufacturer.

The plates are thin such that the heat transfer resistance through the plates is small relative to that of the airstream boundary layer on each side of the plate. Therefore, the material selected for the heat exchange surface does not substantially impact the heat transfer efficiency. Plate spacing ranges from 0.1 to 0.5 inches depending on design and application. The cross-flow heat exchangers are used most often because of their lower cost even though counterflow heat exchangers increase heat transfer and energy efficiency.

The general literature shows the air-to-air heat exchanger to be a reliable low pressure passive heat transfer device with little or no direct communication between the air streams. Additionally, the obvious point is made by these publications that flat metal sheet stock costs less per unit of surface area than tube stock and that this flat sheet stock offers many possibilities for fabricating heat exchanger flow passages that are aerodynamically and hydraulically effective to support fluid flow while minimizing pressure loss. This literature also shows the limiting weaknesses in using flat sheet stock to be: (a) the stress concentration at joints, (b) exchanger size, (c) flow distribution, (d) limited capacity to handle pressure differentials and (d) cleaning of heat transfer surfaces.

The general physical behavior of fluid flow and heat transfer as well as the specific behavior for many configurations has been characterized previously through experiments and observations. Pressure drop and heat transfer are critical performance characteristics of heat exchangers. Both of these performance characteristics are strong functions of the velocity and profile of the airflow as it enters, traverses, and exits the heat exchanger as driven by the physical arrangement and materials of the heat exchanger. Reynolds number and Nusself number are commonly used to quantify local fluid flow and heat transfer characteristics for further characterization of the overall thermal and physical performance of heat exchangers. Reynolds number is a dimensionless group of the ratio of inertial force (free stream velocity) to fiscous force (boundary layer force). Nusself number is the dimensionless ratio found by dividing the convective conductance or heat transfer coefficient, h, by the molecular thermal conductance, k/L, for flow over a surface, or $k/d_e$, for flow in a channel or duct with k representing the thermal conductivity of the fluid, L representing flat surface length and $d_e$ representing the hydraulic diameter of the channel, for the configuration the heat transfer system. The Darcy-Weisbach equation factors in the Reynolds number combining it with relative roughness to determine the duct friction factor to characterize the heat exchanger pressure loss. Namely, $$\Delta p = f_D(L/d)(rv^2/2)$$

Where:

$\Delta p$ is pressure loss along the round pipe or duct $f_D$ is the friction factor which is a function of Reynolds number and relative roughness L/d is the geometric factor for length per unit diameter r is the gas density $v^2$ is the velocity squared Heat transfer in a heat exchanger is characterized by the general equation $$Q = UALmtd$$

Where:

Q is the quantity of heat being transferred BTU/hr

U is the overall heat transfer coefficient which is dependent on conductance through the two air boundary layers at the plate interface and the conductance through the plate BTU/(hr° F. ft²).

Lmtd is the log mean temperature difference between the two air streams

And $U = 1/(Ro + 1/ho + t/k + 1/hi + Ri)$ where:
U=overall heat transfer coefficient
ho=hot-side film coefficient (BTU/(hr° F. ft$^2$))
hi=cold-side film coefficient (BTU/(hr° F. ft$^2$))
t=plate thickness (ft)
k=material thermal conductivity (BTU/(hr° F. ft)
Ro=hot-side fouling resistance ((hr° F. ft2)/BTU)
Ri=cold-side fouling resistance ((hr° F. ft2)/BTU)

It is well known that the limiting factor in heat transfer in heat exchange involving an air side surface is the thermal resistance of the thin layer of low velocity air that hugs the heat transfer surface. Many methods have been employed to disturb this thermal boundary layer by making it thinner or by breaking it up into unique airflow streams. Various mechanisms have been deployed in today's advanced systems with the objective of accomplishing this and improving heat transfer including: pin fins, protruding ribs, louvered fins, offset-strip fins, slit fins, dimples, and others. These wall layer perturbations are meant to not only periodically break up this boundary layer but to agitate the wall layer such that there is improved mixing with the main air flow stream. A penalty of these heat transfer augmentation mechanisms is the increase in hydrodynamic resistance which requires more power to propel the air through the heat transfer channel. It has been shown for example that louvered fins increase the heat transfer by a factor of between two (2) to five (5) but the friction losses increase by a factor of between four (4) to ten (10). Since fan power increases as the square of increased pressure drop such an increase in friction loss is a severe penalty for increased heat transfer effectiveness.

Thermal efficiency of heat transfer augmentation, as characterized by the ratio of ending to beginning heat transfer (Nusself Number) divided by the one third power of ending to beginning friction factor $(((Nu/Nu_o)/(f/f_o)^{1/3})$, shows dimples to be one of the more effective heat transfer augmentation method (Dimples=2.2, Louvered finx=1.6, Pin fins=1.5, and Ribs=1.0)$^a$. Since 2005 the research focus, as documented by a number of researchers, has been on using concavities and dimples, to provide increased heat transfer. The bulk of this research has been conducted through a combination of experiments using test fixtures with single sided channels and computational numerical methods. Heat transfer enhancement tests at the National Research Laboratory Program of KISTEP (Korea Institute of Science and Technology Evaluation and Planning) were conducted using three different roughened surfaces of dimpled, protruded, and complex (dimple-protrusion) in a rectangular channel with a width to height aspect ratio (W/H) of 7. The diameter, depth, and pitch of both the protrusion and dimple is the test rig were selected to match the findings of previous research which identified the best performing values for these variables. The test results show: (a) the high heat transfer region at the rear side of the dimple caused by increased flow mixing induced by upwash flow and pairs of vortices with recirculation flow inside the dimpled surface creating a low heat transfer region; (b) heat transfer enhanced by the impinging effect of the horseshoe vortices on the front side of the protrusion; and (c) compound heat transfer characteristics of impingement and upwash vortices occur for the complex dimple and protrusion configuration. These tests show the lowest friction factor for the dimpled case with the complex case being 3 times higher, and the protrusion case being 6 times higher. A conclusion of the test is that when the dimple/protrusion are installed at both walls, the cross-sectional area of the channel decreases, especially for the protruded case, and that this leads to increased system pressure loss.

U.S. Pat. No. 6,076,598 describes an opposed flow (counter flow) heat exchanger that uses corrugated and flat plate elements arranged to form heat transfer surface and air flow passages. The materials of construction are paper, wood pulp, organic material and metallic foil. The inlet and exit passages (called out in FIG. 1 as #7 and #8) are located at the ends of the heat exchanger and are formed by the heat exchanger skin and the flat plates that run the full length through the heat exchanger core. The corrugated plates are placed on top of and joined to the flat plates with the corrugated plates running the full width but not the full length of the flat plate. The gap between the end of the flat plate and the end of the corrugated plate acts as an air flow entrance or exit passage and distribution/collection header. The corrugated plates form the primary heat transfer surface.

Air has to make many changes in direction as it moves from entrance to exit resulting in large pressure loss (entry, distribution, core area flow, collection, and exit). This flow path limits the flow rates through the heat exchanger leading to the high likelihood of areas with laminar flow and poor heat transfer. Poor heat transfer results in the need for more area and therefore a larger heat exchanger.

Joining each of the corrugated sheets to the flat plates and further shaping and joining the flat plates to form the entrance and exit pathways and the flow channels adds significant complexity and cost to the manufacture of this heat exchanger.

U.S. Pat. Nos. 5,072,790 and 4,848,450, by the same inventor describe a cross-flow heat exchanger where the heat exchanger is made-up of multiple rectangular plates. These plates are formed by turning flanges on each side that establish a specific and uniform standoff height or gap between plates. The plates interlock by sliding the plate flanges together to create an air flow channel and the heat transfer surface. Recognizing that the mechanical process for forming the flanges on large heat exchangers introduces a variation in the space between the plates and a twisting of the plates as they are assembled, the invention was upgraded in U.S. Pat. No. 5,072,790 with the introduction of side and corner support members. These members are designed to more effectively control the gaps between the plates from the edge of the heat exchanger.

The efficiency of this heat exchanger is limited by its design as a cross-flow heat exchanger which limits the heat exchanger's effectiveness/efficiency. Additionally, the side and corner spacer support members are located on the perimeter of the heat exchanger such that the gap between the flat plates can vary as you move to the center of the heat exchanger core. This variation impacts the flow distribution and therefore the heat transfer rate across the plate.

U.S. Pat. No. 4,554,719 describes a cross-flow heat exchanger and the method for manufacturing this heat exchanger. The heat exchanger is formed by a stack of aluminum plates with flanges formed to create lap-joints which hold the plates together and create separation between the plates to form the flow channel for the heat exchanger. Nodules are formed in the aluminum plates to improve air turbulence and heat transfer. The invention centers on the method for forming a heat exchanger core that has lap joints and nodules on rectangular plates with tooling designed to form these shapes in a single step.

The efficiency of this heat exchanger is limited by its design as a cross-flow heat exchanger. The nodule design characteristics with associated impact on pressure drop and Reynolds number as a function of mass flow rate is not accounted for in the method or the design.

U.S. Pat. No. 4,350,201 describes a cross-flow plate and fin heat exchanger having features that act of self fixture the unit for brazing. The unit is composed of conventional elements conventionally stacked one upon another in a standard cross-flow configuration. A corrugated plate is shown as the fin element. The flat plate elements are uniquely configured to constrain and position the fin and spacer elements to achieve the desired configuration to enable brazing or welding without additional positioning or anchoring.

The efficiency of this heat exchanger is limited by its design as a cross-flow heat exchanger. The corrugated plate acting as a fin surface is sandwiched in between two flat plates with no structural or conduction bonding between the corrugated plate and the flat plates. This lack of bond to the flat plates limits the effectiveness of the fin surface. The entrance an exit losses are high with the contraction and change of direction.

U.S. Pat. No. 5,785,117 describes a cross-flow air-to-air heat exchanger core composed of square plates with flanges on each end of the plate where the two opposite sides are bent in the same direction and opposite the direction of the adjacent flanges, the flanges being formed by bending the ends of the plates to 90 degrees.

The efficiency of this heat exchanger is limited by its design as a cross-flow heat exchanger. No provisions have been made to address the inlet and outlet pressure losses. No provisions have been made to reduce air boundary layer heat flow resistance for laminar or transition conditions.

U.S. Pat. No. 4,125,153 describes a cross-flow plate air-to-air heat exchanger core composed of square plates with flanges on two sides of the plates formed by bending the ends of the plates to 90 degrees.

The efficiency of this heat exchanger is limited by its design as a cross-flow heat exchanger. No provisions have been made to address the inlet and outlet pressure losses. No provisions have been made to reduce air boundary layer heat flow resistance for laminar or transition conditions.

The synopsis of the state of the art, recent research, and selected most relevant patents above show (a) past manufacturing limitations have generally limited flat plate heat exchangers to be crossflow heat exchangers; (b) the materials and methods used to join the heat transfer plates and form the pressure boundary have been limited to formed or welded mechanical joints; (c) heat transfer surface augmentation is possible and beneficial; (d) heat transfer augmentation approaches to date have included louvered fins, pins, protrusions, and dimples; (e) augmentation approaches to date have increased heat transfer with a significant pressure drop penalty; and (f) the size, weight, and cost penalties for air-to-air heat exchange remains significant.

SUMMARY OF THE INVENTION

The invention has the primary objective of producing a compact heat exchanger where air and other gases can be made to efficiently and cost-effectively exchange heat from one gas stream to another. The heat exchanger flat plates include features that support incorporation of a significant counterflow section with is the most effective heat transfer configuration. Additionally, the combination of flat plate configuration and flow channel arrangement provide the ability to incorporate multiple crossflow heat exchanger sections in series with the counter flow section. This takes advantage of the heat transfer surface in the inlet and exit channels in a manner that maximizes its heat transfer effectiveness. Material strips are incorporated to form the sides of these flow channels that allow channeling and directing the flow of air on each side of the heat transfer surface in patterns to maximize the heat exchangers effectiveness. These strips also maintain the gap between heat transfer plates and form the pressure boundary at the edge of the heat exchanger. The strips can be adhesively bonded to the plates if required to improve the pressure retaining capability and leak tightness of the heat exchanger boundary seal. The strips can be made of a wide range of materials with the material selected to match the needs of the application. Rounded strips are incorporated in the plates at the inlet and exit of the heat exchanger to limit the inlet and exit pressure losses and therefore limit the power required to circulate the gas through the heat exchanger. Mechanical clips are incorporated in strategic locations of each plate to locate, mechanically connect the plates, maintain the location of the strips, and aide in the distribution of heat exchanger internal loads.

The heat transfer of the heat exchange surface is enhanced using rounded dimples and protrusions arranged such that these occur on the top and bottom of the flow channel. The dimple and protrusion depth and diameter, imprint diameter, and composite pitch are set to yield the most effective heat transfer with the least pressure drop at heat exchanger velocities expected in the application. In particular, the diameter of the dimple and protrusion (the diameter of the spherical tool making the dimple impression) is set to yield boundary layer flow changes with minimal drag or pressure drop by having a diameter twice the diameter of the imprinted dimple. Namely, the imprint is a segment of the sphere with the inserted depth of approximately 7% of the sphere's diameter. This yields a dimple and protrusion surface that smoothly redirects the flow to create flow movement from the boundary layer to the bulk flow stream while offering little resistance to the air flow stream. The dimple and protrusion location and pitch are set such that a constant flow channel cross-sectional area is maintained both horizontally across the channel and longitudinally along the channel. By maintaining such a constant cross-sectional area additional entrance and exit losses (associated with gas movement through the dimpled area) are avoided. Air kinetic energy changes are also limited to directional changes rather than local velocity changes. The net effect is that the significant heat transfer improvement impact of the dimples and protrusions are realized without incurring the increase in friction factor and pressure drop common to other heat exchangers.

A primary objective of the present invention is to provide a sheet metal gas-to-gas heat exchanger that is simple to manufacture and assemble and has low pressure drop with dramatically improved heat transfer capabilities.

Another object of the present invention is to provide a compact gas to gas/air to air heat exchanger that is effective in achieving very close approach temperatures with limited surface area/material.

Still another object of the present invention is to provide gas entry and exit features in a gas to gas heat exchanger having a flow through the heat exchanger that is uniform and at a constant velocity to avoid pressure loss across the heat exchanger from expansion and contraction in the heat exchanger.

A further objective of the present invention is to provide a heat exchanger with a significant counterflow section to achieve small temperature differences between the maximum and minimum temperatures of the two gas flow streams.

A still further objective of the present invention is to provide a heat exchanger with a combination of series cross-flow and counterflow sections to take advantage of the heat transfer surface in the inlet and outlet sections and achieve small temperature differences between the maximum and minimum temperatures of the two gas flow streams.

A still further objective of the present invention is to provide a heat exchanger with enhanced gas side heat transfer coefficient with low pressure drop under various laminar, transition, and turbulent flow conditions to minimize the required heat transfer surface area and energy required to move the gas through the heat exchanger.

A still further objective of the present invention is to provide a heat exchanger with heat transfer surface enhancements that are compatible with available manufacturing tooling and techniques and is inexpensive to produce.

A still further objective of the present invention is to provide a heat exchanger that does not involve welded or brazed assemblies but uses mechanical gasket material strips as the primary joint assembly apparatus to meet a broad range of applications.

A still further objective of the present invention is to provide a heat exchanger that does not involve welded or brazed assemblies but uses closed cell sponge rubber or plastic foam material strips as the primary joint assembly apparatus for low temperature applications.

A still further objective of the present invention is to provide a heat exchanger that uses mechanical clips and gasket material strips to form flow channels that effectively distribute and guide the gas flow through the heat exchanger to meet a broad range of applications.

A still further objective of the present invention is to provide a heat exchanger that uses plastic clips and closed cell sponge rubber or plastic foam strips to form flow channels that effectively distribute and guide the gas flow through the heat exchanger to meet low temperature applications.

A still further objective of the present invention is to provide a heat exchanger that can withstand moderate internal pressure and remain air tight by using adhesive on the boundary and flow channel strips to improve the strength of the heat exchanger joints, the quality of the joint seal, and to extend the joint the full length of the strips.

A still further objective of the present invention is to provide a gas-to-gas heat exchanger with inlet and exit entry shape that minimizes entry and exit pressure losses.

Still further objectives of the present invention is to provide an effective gas-to-gas heat exchanger that can be made of corrosive resistant materials with generally poor thermal conductivity and thereby extend the life and applicability of the heat exchanger.

A still further objective of the present invention is to provide an effective gas-to-gas heat exchanger that can be made of light weight materials.

Still another object of the present invention is to provide a gas-to-gas heat exchanger that is simple to manufacture and assemble out of very light gauge sheet metal.

These and other objects of the present invention will become apparent to those skilled in the art as the description thereof proceeds.

BRIEF DESCRIPTION OF THE DRAWINGS

The present invention will be described with greater specificity and clarity with reference to the following drawings, in which:

FIG. 2 shows an isometric view of a two stage evaporative cooler where the air-to-air heat exchanger uses air cooled by a first stage evaporative cooler to sensibly cool the ambient air before it enters the second stage of an evaporative cooler to enable the evaporative cooler to discharge air closer to the dew point temperature;

FIG. 3 shows an isometric view of an assembled air-to-air heat exchanger bundle;

FIG. 4 shows a plan view of a heat exchanger plate showing the layout of the strips that form the flow channels and heat exchanger boundary, the clips that hold the plates together and secure the location of the flow channel boundary strips and a pattern of the dimples and protrusions that improve the heat transfer of the counter flow section of the heat exchanger;

FIG. 5 shows an isometric view of two adjoining heat exchanger plates with the flow channels, flow channel strips, and flow channel clips for the two air streams as they move from inlet to exit along with the cross flow and counter flow sections formed as the two plates are joined together;

FIG. 6 shows the entrance and exit flow channel with a rounded strip to limit entrance and exit losses;

FIG. 7 shows a close-up of a representative stack of interlocking clips that hold the plates together and secure the location of the flow channel boundary strips which stack includes a top-clip, multiple parallel middle clips, and a bottom-clip;

FIG. 7A shows one of the perpendicular middle clips used in the flow entrance and exit section of the heat exchanger where the flow boundary strips for the flow channels of alternating flow streams run perpendicular to and cross each other at approximately 90 degrees;

FIG. 7B shows the bottom clip that is placed on the bottom of the interlocking clips at the first heat transfer plate to form a smooth and flat heat exchanger exterior;

FIG. 7C shows one of the parallel middle clips that are used in the counterflow section of the heat exchanger where the flow boundary strips for the flow channels of alternating flow streams run parallel and sit on top of each other;

FIG. 7D shows the top clip that is placed on the top of the interlocking clips at the final heat transfer plate to form a smooth and flat heat exchanger exterior;

DESCRIPTION OF THE PREFERRED EMBODIMENT

Figure 1:
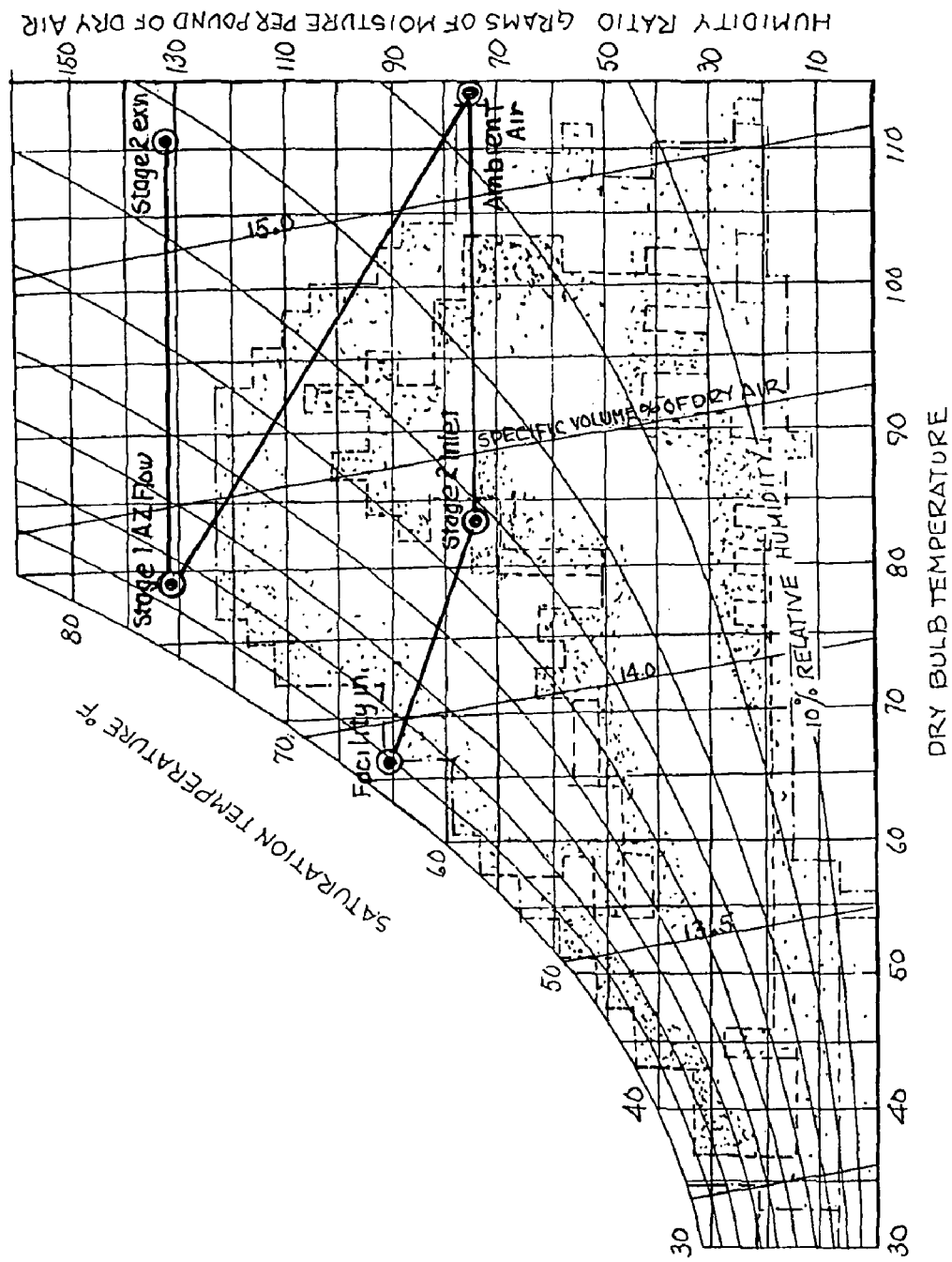
FIG. 1 shows a psychometric chart with a year of wet bulb and dry bulb temperature data plotted in joint frequency plot. Overlaid on this joint frequency plot are the temperatures of the air as it moves through the key components of the two stage cooler, particularly the air to air heat exchanger.

The preferred embodiment of the gas-to-gas (air-to-air) heat exchanger described herein is well suited for numerous applications over a broad range of thermal conditions by selective choice of the materials used for the parts and functions. Examples of such material selection are use of cast metal or graphite for the mechanical clips instead of injection molded plastic and graphite strips instead of plastic foam for the channel flow barriers and pressure boundaries. Additionally, many of the unique elements of the heat exchanger can be adapted or incorporated directly into other configurations to expand the set of applications. Given the need to narrow this broad range of applications in order to describe a preferred embodiment that demonstrates the benefits and allows effective characterization of the innovative features of this gas-to-gas heat exchanger, a two stage evaporative cooler application has been selected for the preferred embodiment. In this application, the gas to gas heat exchanger serves to sensibly cool (cool without adding moisture) ambient air to reduce the air's wet bulb and dry bulb temperatures to create an evaporative cooler that can deliver air at temperatures well below the ambient air wet bulb using two direct evaporative cooling stages. The psychrometric chart in FIG. 1 shows a year of Phoenix, Ariz. wet bulb and dry bulb temperature data plotted in a joint frequency plot. Overlaid on this joint frequency plot are the temperatures of the air for a selected harsh combination of wet bulb and dry bulb temperatures as the air moves through the key components of the two stage cooler, particularly the air to air heat exchanger.

More particularly, FIG. 1 shows an isometric view of an energy recycle evaporative cooler where the air-to-air heat exchanger uses the relatively cool air discharged from a facility to sensibly cool the inlet air to an evaporative cooler to enable the evaporative cooler to discharge air closer to the dew point temperature. It represents one of numerous applications that are made possible or more effective by the air-to-air heat exchanger described herein.

A two stage evaporative cooling unit 10 is shown in FIG. 2. In the first stage 12, which is the indirect cooling stage, ambient air, represented by arrow 14, is evaporative cooled in evaporative cooler 16 and directed (air stream 18) through one side of the air to air heat exchanger 20 to sensibly cool the ambient air on the other side of the air-to-air heat exchanger shown as air stream 22, which as seen in the psychometric charge (FIG. 1) lowers both the ambient air's wet bulb and dry bulb temperatures. Air cooled in this manner can be used directly in some applications or it can be directed to an additional stage of evaporative coolings as done here in this two stage cooler.

The second stage of evaporative cooling takes advantage of the reduced inlet wet bulb temperature of the air (22) to deliver air cooled below the ambient wet bulb. The success of this application is therefore dependent on the size and cost of the air-to-air heat exchanger and, most importantly, its ability to deliver air at dry bulb temperatures as close as possible to the lowest dry bulb temperature of the cooling air stream. In particular, performance is determined by the temperature of the air discharged into the location of use and this temperature is directly dependent on the temperature of the air (wet bulb and dry bulb) delivered to the second stage of the evaporative cooler. In applications such as gas turbine inlet cooling, a one degree change in inlet air temperature results in a measurable change in the heat rate and electrical output of the unit. A one degree change in the inlet air temperature for a building under a certain set of ambient conditions may mean that evaporative cooling is or is not adequate for the application.

The desired thermal, production assembly, and cost characteristics of the heat exchanger in these and other applications are: (a) transfer the sensible heat load from one flow stream to the other, (b) transfer the input heat load with the least surface area possible, (b) transfer the input heat load with the least surface area possible, (c) minimize the pressure drop across the heat exchanger, (d) achieve a close approach temperature such that the temperature difference between the stream to be cooled and the stream doing the cooling is as close as possible, (e) achieve a heat exchanger where the fluid loss and communication between streams is very small, and (f) assemble the heat exchanger quickly with limited resources.

As discussed above, heat exchanger 16 in this preferred embodiment and shown in FIGS. 2 and 3 is made up of the following key elements: (a) multiple thin plates uniformly shaped to form the combination of cross-flow and counter-flow heat transfer surface of the heat exchanger; (b) flow channel guides and sidewall barriers; (c) entrance and exit channel flow shaping strips; (d) interlocking mechanical retaining clips; and (e) enhanced heat transfer surface. Each of these elements will be discussed below.

Multiple thin plates—Heat exchanger 16 shown in FIGS. 2, 3, 4 and 5 is formed by cutting multiple thin (24-28 gauge) metal plates 30 into the desired shape and then stacking them with foam channel guides (½ inch by $\frac{7}{16}$ inch) 32, 34, 36 and 38 inserted in a preset pattern shown in FIG. 4 between adjacent plates. These plates can be stainless steel, galvanized steel, or aluminum dependent on the desired corrosive resistance and the operating environment of the heat exchanger. The shape of the plates is set by starting with a four (4) foot wide by ten (10) foot long rectangular plate. This plate width and length impacts the heat transfer area per plate and therefore the number of plates required to achieve the necessary heat transfer area. This configuration allows for a counterflow section that is 3.1 feet long and crossflow sections that are 3.45 feet long. The heat exchanger footprint and height resulting from plates with these dimensions allows the design of packaged cooling units of a size consistent with others offered for such service in commercial facilities. Other applications will need to balance the plate size, heat exchanger height and weight for a specific application. This size plate is also readily available from metal suppliers. Heat exchanger 16 is configured to have two separated air streams which are a conditioned stream (22 shown in FIG. 2) and a cooling stream (18 shown in FIG. 2) with each stream requiring inlets represented by arrows 40, 42 of FIG. 3 and outlets represented by arrows 44, 46, respectively. Center section 50 of heat exchanger 16 is a counter-flow section meaning that the air streams are to flow in opposite directions on the two sides of the plate that separates them. The ends of the heat exchanger are cross flow sections 52, 54, meaning that the cooling stream flows perpendicular to the conditioned stream. The resultant heat exchange pattern of the two air streams is cross-flow at the ends and counterflow in the center. The cross flow path 56 and counter flow path 58 are shown in FIG. 5, which shows the tops of two adjacent heat exchanger plates that are separated for visual clarification. As shown in FIG. 5 flow paths 56 and 58 run through heat exchanger 16 in opposite directions crossing at sections 52 and 54 and running in opposite directions in the heat exchanger center section 50. This inclusion of a counterflow section and multiple series cross-flow sections results in a heat exchanger with the capability to discharge temperatures of the cooled or heated stream closer to the inlet temperature of the opposite cooling or heating stream. This hybrid arrangement of crossflow and counter flow heat exchanger sections into one heat exchanger is unique.

The length of the heat exchanger plates is a function of the combined length of the counter flow section and the length of the two equal length entrance and exit crossflow sections. The length of the inlet and exit crossflow sections (from tip to start of the crossflow section) is a function of the need to keep the flow area cross-section constant from inlet to exit in order to minimize the pressure drop across the heat exchanger. Keeping the flow area cross-section constant requires that the heat exchanger inlet and exit flow areas must equal the flow area cross-section of the counter flow section. The need to keep a constant cross section is a function of the need to minimize the pressure drop across the heat exchanger and the behavior of the fluid as this cross section changes. In particular, if such changes in cross sectional area were to exist they would change the velocity and density of the gas as it moved along the path from inlet to exit. Such changes would be accompanied by increased pressure loss across the heat exchanger. In order to maintain a constant cross sectional area given that the plates have the same gap height between them from inlet to exit, the channel width must be the same from inlet to exit. This is achieved at each end of the heat exchanger by establishing two (w) points 60, 62 shown in FIG. 4 on opposite outside edges of the heat exchanger plates where the counter flow section joins the entrance/exit section. These two points are to be the center of two circular arc segments 64, 66 shown in FIG. 4 with a radius equal to the width of the heat exchanger and rotating from the end of the counterflow section to point 68 where the two arcs meet. The heat exchanger flow path layout is structured to have flow channels of the same length by having the entrance on one side of the heat exchanger plates and the exit on the other side as shown in FIG. 5 and supported by flow paths 56, 58 (also 56A, 56B, 58A, 58B). Having flow paths of the same length results in flow channels with the same pressure loss and even flow throughout the heat exchanger. This configuration also results in each channel having the same number of series cross flow areas even though the sequence of cross flow area and counter flow area are not the same for each channel. Arranging the cross flow areas in series improves the effectiveness of the heat transfer area since it improves the correction factor for mean temperature difference.

Having set the size of the plates at 4 ft by 10 ft, the number of plates is determined by the number required to yield heat transfer surface necessary to transfer the design heat load given by the equation Q=UA Lmtd. In this preferred embodiment for the 18,000 cfm two stage cooler the heat load is 466,000 BTU/hr, the overall heat transfer coefficient is 19 (BTU/(hr ° F. ft$^2$), and the Lmtd is 3.7° F., yielding 6,607 ft$^2$ for the surface area. This results in the need for 206 plates in the heat exchanger. With the other dimensions of the geometry set, the gap between the plates is adjusted to control the flow opening and flow velocities in the heat exchanger. With a 7/16 inch gap the flow opening is 14 square feet and the flow velocity through the heat exchanger is 1270 fpm or 21 fps. The Reynolds Number is 8,210 and the pressure droop across the heat exchanger is 0.3 inches of water. Closing the gap increases the velocity and the Reynolds number which reduces the number of plates but also increase the pressure drop across the heat exchanger. The preferred plate gap is between 5/16 inch and 9/16 inch for this application with a head less than one (1) inch of water pressure, but can vary as the applications vary.

Foam Pressure Boundary and Flow Channel Guides—The pressure boundary for the two gas streams is formed on the top and bottom by the flat plates 30 and foam strips 70, 72 between the plates on the sides 74, 76 shown in FIG. 5. The foam strips are ½ inch wide and 0.010 thicker than the design gap between the plates. Additional foam strips 80, 82, 84, 86 are used as flow stream guides in between the two outside pressure boundary strips. There is a wide variety of material with varying properties available to meet the demands of the specific application (temperature range, pressure, cost, life, and strength) for this flow channel guide and pressure boundary function. The strip material selected may be a closed cell polyethylene foam. This material retains its elasticity and strength to maintain its shape and exert a sealing force on the two interfacing plate surfaces. The surfaces of this foam strip are smooth with a low relative roughness factor limiting its contribution to the heat exchanger pressure drop. The temperature and humidity range of this application (−40° F. to 130° F.) and (0% to 100%) does not challenge the capabilities of this material. Pressure sensitive adhesive can be applied to the surfaces of these foam strips to enhance the sealing capability and extend the range of differential pressure the system can meet at the heat exchanger pressure boundary. The heat exchanger orientation can result in having the plates vertical or horizontal. The weight of the plates must be accommodated by the foam strips and mechanical clips when the plates are in the horizontal position. This weight, as concentrated on the bottom layer of thin plates, can range from 70 to 225 lbs per square foot depending on the plate material (aluminum or stainless steel). The plate material selection is influenced primarily by corrosion, weight and cost concerns rather than heat transfer concerns. The spacing of the foam guides to yield a 12" channel results in 6 square inches of foam material and approximately one (1) mechanical clip sets to support each square foot of heat exchanger foot print or a load of between 12 to 33 lbs per square inch dependent on selected plate material.

The foam strips allow internal flow channel layout to be arranged to achieve a balanced flow between the channels and to have the flow enter the counter flow section in a well distributed manner. The smooth radius guide layout limits the pressure loss impact of this need to change the direction of the flow to have it pass through the heat exchanger in the desired arrangement.

Entrance and Exit Channel Strip—Referring to FIG. 6, a half round strip of foam 90 is inserted in the gap between the plates 30 and the pressure boundary flow strip at the inlets and exits after the heat exchanger is assembled FIG. 6. This half round strip significantly reduces the inlet and exit losses by forming a rounded edge inlet and exit. The half round strip is sized for an interference fit in the gap between the plates. Adhesive is applied to the back edge of the strip inserted between the plates to increase the reliability of the assembly. This strip is made of the same closed cell polyethylene foam with its low relative roughness and other desirable physical characteristics of strength, elasticity, and life.

Interlocking Plastic Retaining Clips—Interlocking injection molded plastic retaining clips are used to maintain the gap between plates, the position of the foam boundary and channel guide strips and to mechanically position and join the heat transfer plates. An assembled stack or set 96 of these interlocking clips is shown in FIG. 7. To accommodate each of the clips a one inch square hole 105 is cut in each heat transfer plate 30 at the location and in an orientation consistent with the clip deployment position shown in FIG. 4 wherein roundel 25 identifies the location of parallel configured clips and roundel 26 identifies the location of perpendicular configured clips. These interlocking clips include a set that is designed to join plates in the counter flow section where the foam strips from layer to layer lie parallel to one another such that the male and female ends of the clips are parallel and a set that is designed to join plates in the cross flow sections where the foam strips from layer to layer lie perpendicular to one another such that the male and female ends of the clips are rotated 90 degrees from each other. Each set 96 includes bottom clip 98, middle clips 100 and top clips 102.

Top clip 102 shown in FIG. 7D has a retainer plate 104 that is used to transfer the clip straining force generated by the interlocking clip as a mechanically drawing to heat transfer plates and to support the weight of the plate. The retainer plate is 0.062 inches thick with outside envelope of one square inch. A shoulder plate 106 is the same shape as the retainer plate and approximately 0.760 inches square, which is a few thousandths of an inch smaller than the hole through the heat transfer and is positioned therein. The shoulder plate serves to position the clip such that the clip aligns the heat transfer plates and positions the flow channel strips. The top clip includes a pair of latch legs 108, 110 having lips 112, 114 extending laterally therefrom.

Middle clip 100 shown in FIG. 7C includes a shoulder plate 116 the same size and shape as shoulder plate 106. Female latch tabs 118, 120 extend upwardly from their shoulder plate and extend through hole 122 in the respective plate, whereby shoulder plate 116 mates with the hole. A pair of strips 122, 124 extend from the underside of shoulder plate 116. Latch legs 126, 128 extend downwardly from strips 122, 124, respectively, and are terminated by laterally extending lips 130, 132, respectively.

Bottom clip 98 shown in FIG. 7B includes a shoulder plate 140 commensurate in size and shape with shoulder plates 106, 116 and mates with hole 105 in a plate. A pair of locking tabs 142, 144 extend downwardly and include lips 136, 138, extending laterally for engagement with the underside of an engaged plate to lock a bottom clip in place. A retainer plate 150 rests upon the engaged plate, as shown in FIG. 7. The retainer plate supports a pair of female latch tabs 152, 154 for engagement by the latch legs of a middle clip.

FIG. 7A illustrates a variant 160 of middle clip 100. Herein, strips 122, 124 have been reoriented 90 degrees with respect to shoulder plate. Such reorientation angularly relocates latch legs 126, 128 by 90 degrees with respect to the orientation of female latch tabs 118, 120.

The shoulder plates serve to position the clips such that they align the heat transfer plates and position or locate the flow channel strips. The shoulder plate of bottom clip 98 and the area of the shoulder plate that adjoins the flow channel strip in the top and middle clips 102, 100 are the same thickness as the heat transfer plate such that a smooth surface is created for the channel strips as they run from the heat transfer plate across a clip. The latch legs are designed with a separation of slightly less than the width between the female latch tabs to assure effective capture of the female latch tabs and to provide additional force and resistance to maintain a locked latch during operations. The feet of the latch legs are designed to snap into and latch with the female latch tabs of the respective clips. The length of the latch legs of the clips are set so that the combined latch leg length and female latch tab length set and maintain the design gap between the heat transfer plates. The gap between the latch legs and the female latch tabs, when assembled, result in a gap of less than 0.010 inches and thereby work with the foam strips to maintain the spacing between the plates. A sloped edge is incorporated into the foot on the latch legs and rounded edges are incorporated into the female latch tabs to minimize the force required to slide the latch tabs down over the female latch tabs and minimize the force required for the latch legs to seat in the female latch tabs to engage and lock the clips together.

The surface area and thickness of the latch legs and female latch tabs that are engaged to form the interlocking joints have an engaged overlap area and related material thickness to resist a ten pound separation force. This resistance capability is more than adequate for a two stage evaporative cooler application and the typical air to air heat exchanger application.

Assembly is accomplished by first inserting and securing the bottom clips into the locator holes in the bottom end plate; second, placing the flow channel guide strips on the end plate and between the tabs of the bottom clips along their designated path; third, middle clips are inserted over the flow channel guide strips and into the female latch tabs with sufficient force to seat the latch legs of the middle clip into the bottom female latch tabs; fourth, a heat exchange plate is placed and rested on top of the flow channel strips and the middle clips moved as necessary to seat the plate on the middle clip shoulder plate; fifth, flow channel guide strips are placed on the heat transfer plate and between the protruding female latch tabs of the middle clip; sixth, the third, fourth and fifth steps are repeated until all the intermediate heat exchanger plates have been assembled; seventh, the heat exchanger top plate is placed and rested on top of the flow channel strips; eight, top clips are inserted into the holes in the top heat exchange plate with the latch legs pushed through the holes in the top plate with sufficient force to seat the latch legs of the top clip into the female latch tabs for uppermost middle clips.

Bottom clip 98 is designed to be inserted from the top through square hole 105 in the bottom heat transfer plate of the heat exchanger with the retainer plate 150 being larger than the hole through the heat transfer plate. A pair of locking tabs 142, 144 below the shoulder plate 140 protrudes through the end plate to lock the bottom tab in place. The retainer plate forms part of the heat exchanger air boundary and transfers the weight of the heat exchange plates to the end plate. The anchored bottom clips connect to the interlocking clips of the other heat transfer plates to mechanically join the end plate to the heat transfer plates. This end plate may have a return flange incorporated in the counter flow section to increase its stiffness and enable it to collect the distributed loads of the heat exchanger that arrive via the clips and transfer these loads to the heat exchanger support frame.

The middle clip is designed to connect the internal plates to the end plates. This clip comes in either a parallel (100 FIG. 7C) or a perpendicular (160 FIG. 7A) configuration meaning the latch legs and female latch tabs are parallel or offset by 90 degrees. This difference in arrangement addresses the layout difference of the flow channel boundary strips in alternate layers where they run parallel in the counterflow section and perpendicular in the crossflow sections. The retainer plates support the heat transfer plate and restrains the mechanical joining force. The shoulder plates locate and maintain the receptive clip and plate position. These shoulder plates are located between the latch legs and the female latch tabs. Holes 166 (see FIG. 7A) are cut in the shoulder plate of the clips to provide the capability to disassemble the heat exchanger without cutting the clips. Disassembly is accomplished by inserting a tool through the shoulder plate holes to disengage the latch legs of the next layer's clip from the female latch tabs of the exposed clip.

Top clip 102 (FIG. 7D) is designed to be inserted through the top heat transfer plate of the heat exchanger with retainer plate 104 being larger than hole 105 through the heat transfer plate. This retainer plate forms a surface that is part of the heat exchanger air boundary and transfers the restraining force generated by the interlocking clips to the end plate to mechanically join the top heat exchanger end plate to the next to last heat transfer plate. This retainer plate is thin and flat such that the heat exchanger end plate surface is relatively flat. The top clip, like all clips, has a shoulder plate 106 which locates and maintains the position of the heat transfer plates and the flow channel boundary strips.

Figure 8A:
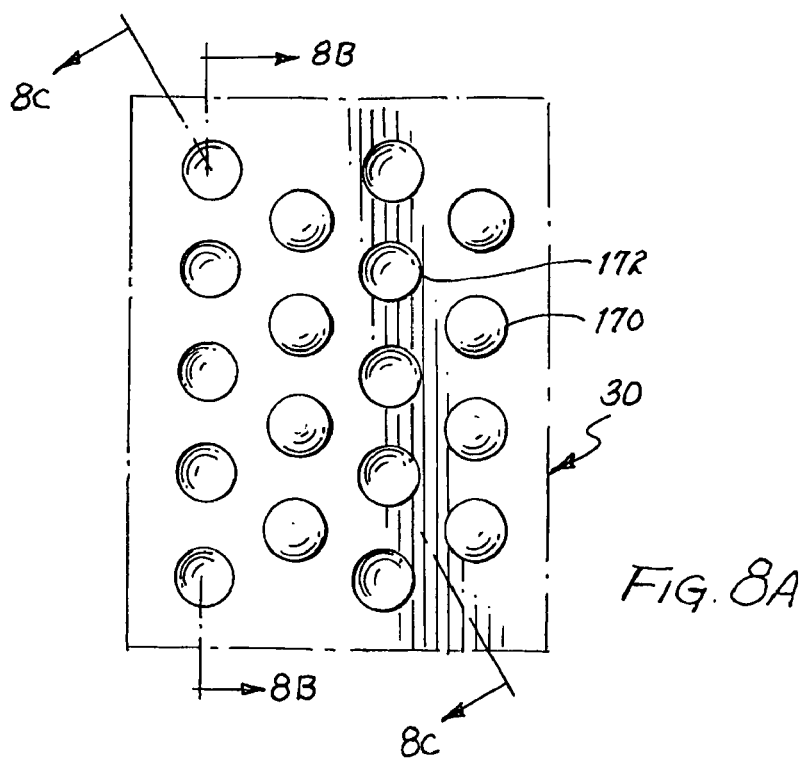
FIG. 8A shows the plan layout relationships of the protrusions and dimples in relation to one another.
Figure 8B:
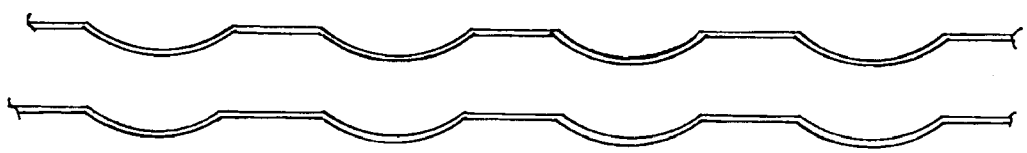
FIG. 8B is a side view taken along lines 8B-8B shown in FIG. 8A and shows the relationship between the dimple and protrusion characteristics and the flow channel height and offers a cut away horizontal cross section of the flow channel and the relationship of the protrusion to dimple location such that the distance from upper to lower flow channel wall remains constant horizontally across the flow path.
Figure 8C:
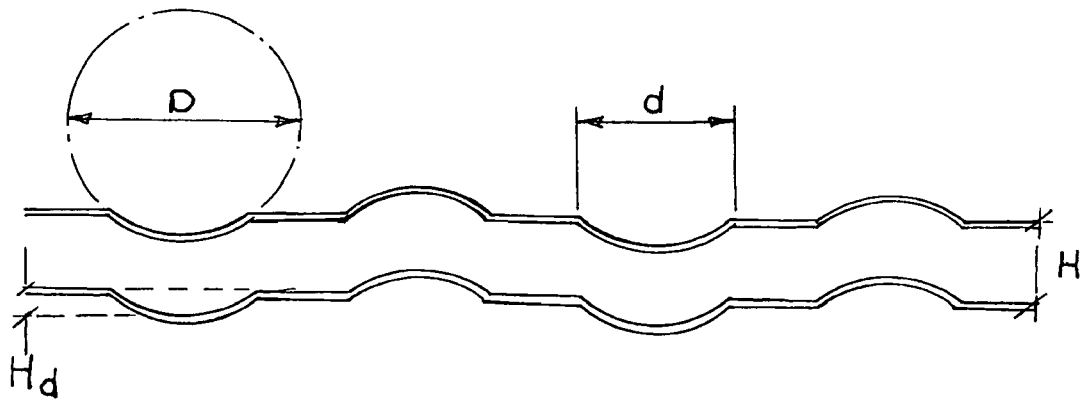
FIG. 8C is a side view taken along lines 8C-8C shown in FIG. 8A and shows a cut away longitudinal cross section of the flow channel with the relationship of the protrusion to dimple location such that the distance from upper to lower flow channel wall remains constant longitudinally along the flow path.

Enhanced Heat Transfer Surface—With the relatively low air velocities through the heat exchanger and low relative roughness of the plate surfaces, the Reynolds number associated with the air flow would put it in the laminar flow region with the associated low heat transfer and low pressure drop performance if no other actions were taken. This would lead to a very large and expensive heat exchanger independent of actions taken to achieve an effective cross-flow and counter-flow configuration. A unique dimple and protrusion configuration illustrated in FIGS. 8A, 8B and 8C is used to achieve the needed improvement in heat transfer coefficients while minimizing the heat exchanger pressure drop. The heat transfer coefficient is improved by this unique dimple and protrusion configuration by a factor of more than five (5) while the increase in pressure loss is limited to a factor less than three (3). This dimple configuration for the preferred embodiment uses the following parameters: Dimple and Protrusion diameter (D) (40) is 4.56 times the flow channel height (H) (41) or D=4.56*H; diameter of the dimple and protrusion imprint (d) (42) is one-half the Dimple/Protrusion diameter D or d=D/2; depth of dimple and protrusion ($H_d$) (43) is 30% of the of the channel height or $H_d$=0.3*H. The triangular pitch of the dimples and protrusions (s) (44) is set at 1.8 times the imprint diameter or s=1.8*d.

Dimples 172 and protrusions 170 can be incorporated on full heat transfer plate 30 or on any of the individual cross-flow or counterflow sections. Limiting the dimples and protrusions to certain sections rather than incorporating them on the full heat exchanger has the benefits of limiting the associated pressure loss and limiting manufacturing time. The pattern of dimples 172 is set by both flow and manufacturing considerations. The flow considerations deal with (a) the need to avoid short circuits through the heat exchanger and to get the gas boundary layers and bulk flow stream to mix effectively as the gas moves through the heat exchanger, (b) limiting the drag and expansion/contraction losses, and (c) achieving a constant flow area by configuring dimples 172 and protrusions 170 to account for the fact that plates 30 are stacked with the flow channel protrusions on one plate becoming flow channel dimples on the adjoining plate. Representative sections 8B-8B and 8C-8C shown in FIGS. 8B and 8C, respectively, through adjoining heat transfer plates 30 show the effect of having the dimples and protrusions located above one another to create a constant flow area between the plates. The manufacturing issues deal with (a) the spacing necessary for the tooling that creates the dimples and protrusions to operate and function, and (b) the spacing necessary to produce plates with undisturbed areas to accommodate installation of the flow channel guide strips. The dimple/protrusion size and shape is configured to be sufficiently aerodynamic to limit the pressure drop addition while causing the boundary layer to change direction and mix with the bulk flow stream. This is accomplished by creating a dimple/protrusion that represents a small segment of a larger sphere of sufficient depth to penetrate the boundary layer such that the arc radius of the dimple/protrusion presents a sufficient yet smooth and graduated change in flow surface. The dimples/protrusions of the preferred embodiment provide such a smooth and gradual flow stream perturbation while changing the surface sufficiently to accelerate and mix the boundary layer with the bulk flow stream. A constant flow area for the air as it traverses the heat exchanger from entrance to exit is achieved to limit pressure drop through the configuration of dimples and protrusions.

The invention claimed is:

1. An air to air heat exchanger comprising in combination:
  (a) a plurality of stacked spread apart plates;
  (b) a plurality of sets of clips intersect adjacent plates to define a space therebetween and to define an outline of each of a plurality of curvilinear air flow paths intermediate adjacent plates;
  (c) a length of compressible material generally coincident with each outline to define the boundaries of the air flow paths intermediate each pair of adjacent plates;
  (d) a first path of said plurality of paths between a first pair of said adjacent plates including a first end section curved in a first direction, a second end section curved in a second direction, said second direction being opposite to the first direction and a first straight center section interconnecting said first and second end sections;
  (e) a second path of said plurality of paths between a second pair of said adjacent plates including a third end section curved in the second direction and generally coincident with said first end section, a fourth end section curved in the first direction and generally coincident with said second end section and a second straight section generally coincident with said first straight section and interconnecting said third and fourth end sections;
  (f) a first inlet for introducing a first gas to said first end section and exhausting the first gas from said second end section through a first outlet; and
  (g) a second inlet for introducing a flow of a second gas to said fourth end section and exhausting the second gas from said third end section through a second outlet to provide counter flow.

2. The heat exchanger as described in claim 1 including a third path of said plurality of paths between said first pair of plates adjacent one side of said first path and a fourth path of said plurality of paths between said second pair of plates and adjacent one side of said second path.

3. The heat exchanger as described in claim 2 wherein said first and third paths are in fluid communication with each of said first inlet and said first outlet and wherein said second and fourth paths are in fluid communication with each of said second inlet and said second outlet.

4. The heat exchanger as described in claim 1 including dimples and protrusions disposed in adjacent ones of said plates for reducing the presence of laminar flow of the gas adjacent said plates.

5. The heat exchanger as described in claim 4 wherein said dimples are disposed in one plate of a pair of said adjacent plates and wherein said protrusions are disposed in the other plate of said pair of adjacent plates.

6. The heat exchanger as described in claim 1 wherein each set of said plurality of sets of clips is mounted in holes in adjacent ones of said plurality of plates and wherein each set of clips of said plurality of sets of clips includes latch legs of one clip of a set of clips for engagement with female latch tabs of another clip of the set of clips to secure adjacent plates with one another and maintain the spacing therebetween.

7. The heat exchanger as described in claim 5 wherein each of said dimples positionally corresponds with one of said protrusions in the adjacent one of said pair of plates to maintain the spacing between the surfaces of said pair of adjacent plates essentially constant.

8. The heat exchanger as described in claim 1 including a fifth path of said plurality of paths between said first pair of plates adjacent one side of said third path and a sixth path of said plurality of paths between said second pair of plates adjacent one side of said fourth path.

9. The heat exchanger as described in claim 8 wherein said first, third and fifth paths are in fluid communication with each of said first inlet and said first outlet and wherein said second, fourth and sixth paths are in fluid communication with each of said second inlet and said second outlet.

10. The heat exchanger as described in claim 8 including dimples and protrusions disposed in adjacent ones of said plates for reducing the presence of laminar flow of the gas adjacent said plates.

11. The heat exchanger as described in claim 10 wherein said dimples are disposed in one plate of a pair of said adjacent plates and wherein said protrusions are disposed in the other plate of said pair of adjacent plates.

12. The heat exchanger as described in claim 8 wherein each set of said plurality of sets of clips is mounted in holes in adjacent ones of said plurality of plates and wherein each set of clips of said plurality of sets of clips includes latch legs of one clip of a set of clips for engagement with female latch tabs of another clip of the set of clips to secure adjacent plates with one another and maintain the spacing therebetween.

13. The heat exchanger as described in claim 5 wherein the depth of each of said dimples and the height of said protrusions are essentially equal and wherein each said dimple is essentially across from one of said protrusions whereby the depth of the space between adjacent plates of a pair of said plates is essentially constant.

14. A method for exchanging heat between two gases, said method comprising the steps of:
(a) conveying a flow of a first gas through a first curvilinear path between a first pair of plates, having a first inlet and a first outlet, which path includes a first curved end section in communication with the first inlet, a second curved end section in communication with the first outlet and a first straight section interconnecting the first and second end sections;
(b) interconnecting the flow of the first gas from the first curved end section to the second curved end section with a first rectilinear section;
(c) further conveying a flow of a second gas through a second curvilinear path between a second pair of plates and having a second inlet and a second outlet, one plate of the first pair of plates being common with one plate of the second pair of plates, the second path including a third curved end section in communication with the second inlet, a fourth curved end section in communication with the second outlet and second straight section interconnecting the third and fourth end sections, whereby the first and second curvilinear paths provide cross flow to the first and second gases to enhance heat exchange between the first and second gases;
(d) further interconnecting the flow of the second gas from the third curved end section to the fourth curved end section with a second rectilinear section;
(e) interconnecting the adjacent plates with sets of clips arranged to define the outlines of the respective first and second curvilinear paths; and
(f) defining the boundaries of the first and second curvilinear paths with compressible material positionally corresponding with outlines.

15. The method as described in claim 14 including the step of providing a plurality of the first curvilinear paths adjacent one another and the step of providing a plurality of the second curvilinear paths adjacent one another.

16. The method as described in claim 14 including the step of exposing the flow of the first gas along the first curvilinear path to opposing dimples and protrusions and further exposing the flow of the second gas along the second curvilinear path to opposing dimples and protrusions, whereby laminar flow along the first and second curvilinear paths is reduced.

17. The method as described in claim 14 including the steps of:
(a) establishing a plurality of adjacent first curvilinear paths between a common pair of plates; and
(b) further establishing a plurality of adjacent second curvilinear paths between a common pair of plates.

18. The method as described in claim 14 including stacking a plurality of the first pair of plates interleaved with a plurality of the second pair of plates to establish multiple interleaved first and second curvilinear paths.

19. An air to air heat exchanger comprising in combination:
(a) a plurality of stacked spread apart plates;
(b) a plurality of clips intersecting adjacent plates to define a space therebetween and to define a plurality of curvilinear air flow paths intermediate adjacent plates, said plurality of clips being mounted in holes in said plates, said plurality of clips include latch legs of one clip for engagement with female latch tabs of another clip to secure adjacent plates with one another and to maintain the spacing therebetween;
(c) a plurality of strips of foam sealing the boundaries of the air flow paths;
(d) one of said paths between a first pair of said plates including a first end section curved in a first direction, a second end section curved in a second direction, said second direction being opposite to the first direction and a first straight center section interconnecting said first and second end sections;
(e) another of said paths between a second pair of said plates wherein one plate of said first and second paths is common and including a third end section curved in the second direction and extending across said first end section, a fourth end section extending across said second end section and a second straight section coincident with said first straight section and interconnecting said third and fourth end sections;
(f) a first inlet for introducing a first gas to said first end section and exhausting the first gas from said second end section through a first outlet; and
(g) a second inlet for introducing a flow of a second gas to said fourth end section and exhausting the second gas from said third end section through a second outlet to provide counter flow and multiple cross flow between the first and second gases.

* * * * *